Figure 1:
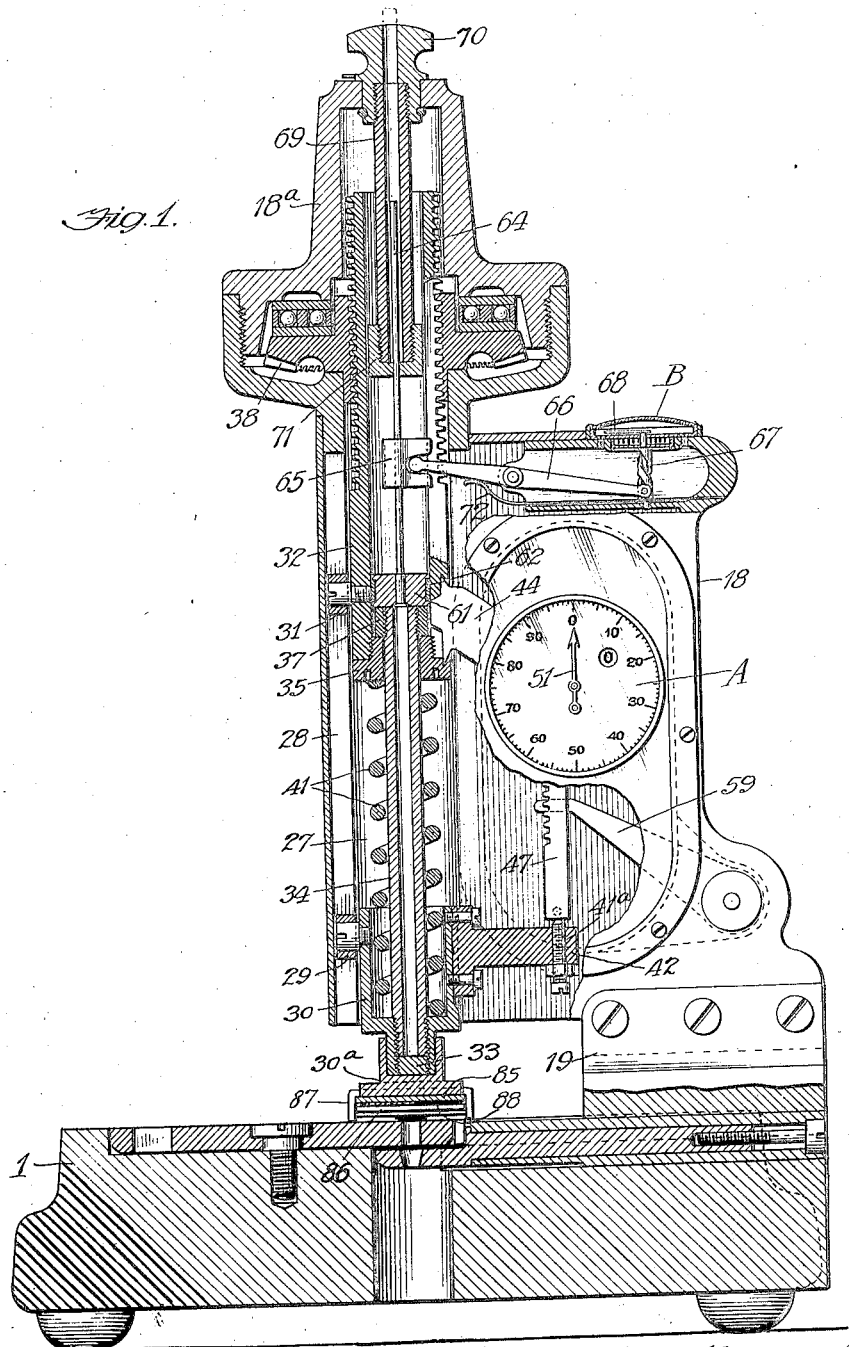

J. W. WEBB.
MACHINE FOR TESTING PAPER AND OTHER MATERIALS.
APPLICATION FILED JAN. 30, 1919.

1,317,468.

Patented Sept. 30, 1919.
2 SHEETS—SHEET 1.

Witnesses
Martin H. Olsen.
Robert Dobberman.

Inventor
John W. Webb
By Redon, Hibben, Davis & Macauley
His Attys

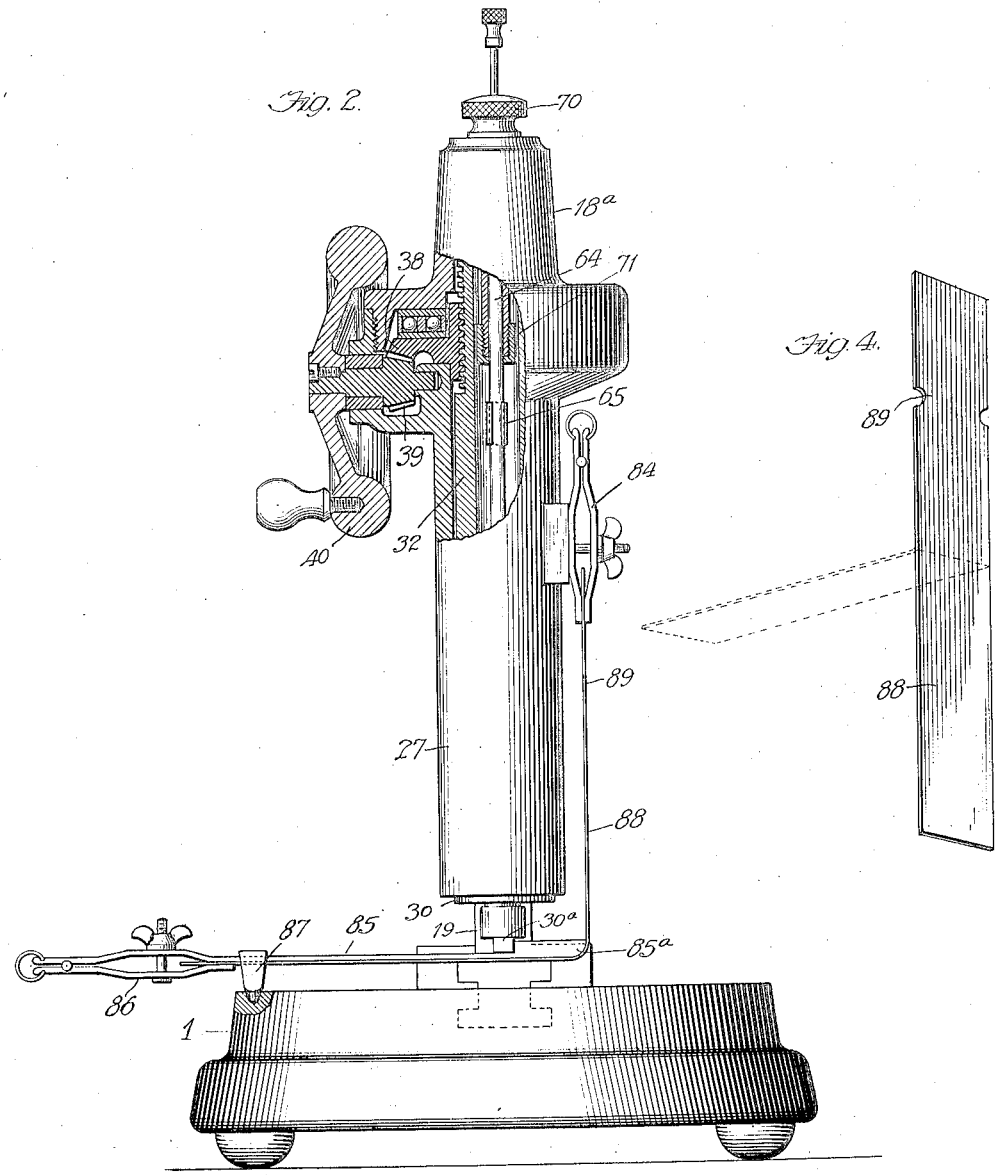

UNITED STATES PATENT OFFICE.

JOHN W. WEBB, OF CHICAGO, ILLINOIS, ASSIGNOR, BY MESNE ASSIGNMENTS, TO WEBB TESTER INCORPORATED, OF CHICAGO, ILLINOIS, A CORPORATION OF DELAWARE.

MACHINE FOR TESTING PAPER AND OTHER MATERIALS.

1,317,468.             Specification of Letters Patent.     Patented Sept. 30, 1919.

Original application filed September 23, 1918, Serial No. 255,272. Divided and this application filed January 30, 1919. Serial No. 274,035.

*To all whom it may concern:*

Be it known that I, JOHN W. WEBB, a citizen of the United States, residing at Chicago, in the county of Cook and State of Illinois, have invented certain new and useful Improvements in Machines for Testing Paper and other Materials, of which the following is a specification.

The present application is a division of my pending application for patent for paper and paper box testing machines filed September 23, 1918, Serial No. 255,272, in which I have described a machine having a sliding plunger member actuated through a compression spring by a second plunger operated by a suitable hand wheel. A dial mechanism is provided in said machine to indicate the relative movement of the plungers, that is the compression of the spring and consequently the stress on the first mentioned plunger, and a second dial, arranged to be connected and disconnected as desired, is arranged to measure the extent of movement of the first mentioned plunger under increasing stress of the spring connection between the plungers, and thereby measure the deflection of materials under test. This application relates more particularly to an arrangement of clamping members whereby the pressure and deflection indicating mechanisms of the machine are arranged and adapted to test the tensile strength of a strip or ribbon of thin material, such as paper, textile fabrics, etc., and to measure the amount of stretch of such material before a break occurs, the essential elements of the invention covered by the present application being recited in the appended claims.

Of the drawings Figure 1 is a central vertical section of the machine taken from front to rear; Fig. 2 is a front view of the machine showing the clamping members arranged to secure a strip of paper in position for making a test of its stretch and breaking strength; Fig. 3 is a top plan view of the lower clamp member, detached; and Fig. 4 is a perspective of a strip of material, notched preparatory to being tested.

The same reference characters indicate the same parts in all the figures of the drawings.

Describing now the particular embodiment of my invention illustrated in the drawings, the bed plate 1 of the machine consists of a metal casting of sufficient weight to afford stability to the plunger frame and mechanism supported thereby, see Figs. 1 and 2.

The plunger frame 18 of the machine, upon which are mounted the spring-driven plunger and its operating mechanism, together with two dials and associated mechanisms, one for indicating the tension of the plunger spring and one for indicating the deflection exhibited by material under pressure by the plunger, is attached to the bed plate of the machine by means of a foot block 19 which, for purposes unnecessary to an understanding of the present invention, is arranged to slide laterally at either of two different levels into engaged position in a double slide way in the bed plate, the frame in the practice of the present invention being placed at the lower level, as shown.

The plunger mechanism, which will next be described, comprises essentially an upper, actuating member and a lower, plunger member telescoping with it and intermediately connected therewith by a spring, the plunger member being equipped with a plunger head or die for puncturing or otherwise acting upon the material being tested, and the upper, plunger-actuating member being provided with a train of gearing by means of which the connected elements may be forced downwardly against the material to transmit pressure through the spring to the plunger member.

Both the upper and lower members are mounted in a barrel 27 formed in the casting which constitutes the intermediate part of the plunger frame 18 and in a cap 18$^a$ forming the top portion of such frame, and such members are arranged in axial alinement with the center of the bed plate. A longitudinal guide slot 28 is cut in the barrel 27 to receive a guide roller 29 carried by the plunger member 30, and a guide roller 31 carried by the plunger-actuating-member 32.

The plunger member is shouldered to form a depending cylindrical portion equipped with a pin adapted to make a bayonet joint with the contact member 30$^a$ of the plunger. In the present instance the reduced end portion of the plunger member is formed with a screw-threaded bore, the lower end of the bore being closed by a plug 33 and the upper portion engaging the lower threaded end of an upwardly extending rod 34. The upper end of this rod makes sliding engagement with an orificed plug 35 screwed into the threaded lower end of the tubular plunger-actuating-member 32. The lower face of a nut 37 carried by the upper screw-threaded end of the rod 34 coöperates with upper face of the plug 35 to limit relative movement of the plunger-actuating and plunger members in a direction to separate them.

The upper part of the plunger-actuating member is threaded to engage threads formed within the hub of a bevel gear wheel 38 which is journaled in a seat near the upper end of the barrel 27 of the frame. A thrust ball bearing of ordinary construction is arranged at the upper side of the gear wheel to sustain the upper thrust of the plunger-actuating member and insure smoothness of operation. The gear wheel is rotated by a bevel pinion 39 having a shaft journaled in the frame, to which shaft is rigidly secured a hand wheel 40.

The spring 41 of the plunger mechanism is of such strength as to transmit sufficient pressure to the plunger member to make the severest test contemplated without reaching its elastic limit. Its length is such that when the plug 35 and nut 37 are in contact the spring will just touch its opposite seats without compression.

For the purpose of securing a piece of paper or other material in proper position to be tested, the upper part of the plunger frame 18 is provided on one side with a clamp 84 adapted to hold one end of the strip, and the other end is held by clamping jaw 86 which is carried by the outer end of a rocking clamping plate 85 and is arranged to coöperate with a clamping surface on the lower side thereof. The plate 85 is mounted to rock on two legs 87 which loosely engage seats or sockets in the bed plate 1 of the machine. The inner portion of the clamping plate extends under the plunger member 30ª and its rounded end 85ª is arranged in vertical alinement with the clamp 84.

Preferably the material 88 to be tested is cut in the form shown in Fig. 4, by the aid of a sheet metal pattern, or otherwise, with a pair of opposite rounded notches defining a neck 89 of a standard dimension,—as one inch, or one-half inch,—suitable for expressing the results of the test in recognized units, and in making a test the end adjacent the notch is secured in the clamp 84, the strip extending downwardly smoothly around and underneath the end 85ª of the rocking plate 85 and its other end being secured by the clamp member 86. The length of the strip intermediate the clamps must be such that the inner portion of the rocking plate will be in raised position, nearly, or just in contact with the plunger member 19 when raised to the position shown in Fig. 2.

With the construction and arrangement of parts thus far described, it is obvious that when the plunger and plunger-actuating members are lowered from raised position through operation of the hand wheel 40, they will travel together until the plunger member contacts the rocking plate 85, after which the lower or plunger member will remain almost stationary, yielding somewhat under the increasing pressure, until a point is reached at which the paper will break at the neck 89. Since it is a law of physics that the stress applied to a spring produces a compression directly proportional to the stress, it is manifest that proper calibration of the relative movement of the upper and lower members of the plunger mechanism will give an indication of the stress required to produce a rupture of the paper.

The mechanism for indicating relative movement between the plunger-actuating and plunger members, and consequently the stress of the plunger spring, comprises a contact member carried by the plunger member and a train of gearing mounted on the plunger actuating member and connected to the hand of a stress-indicating dial A, said train of gearing being actuated through a vertical screw 41ª carried by a bracket 42 secured to and extending laterally from the plunger member through a slot at the rear of the plunger barrel and into a narrow vertical chamber formed by parallel portions of the frame constituting a dial housing continuous with the barrel on opposite sides of said slot. The dial mechanism is mounted upon a bracket 44 secured to the upper or plunger-actuating-member, and consists of a rack bar 47 slidingly mounted in the dial casing and arranged to coöperate with the contact screw 41ª, and a train of gearing (not herein illustrated) intermediate such rack bar and the indicating hand 51 of the dial. A manually operable resetting arm 59 is provided for resetting the rack bar to lower position and the indicating hand 51 to zero.

In making a test of the breaking strength of a strip of paper or other material, the material may exhibit more or less give or stretch before a rupture occurs, and this stretch is evidently measured by the downward travel of the lower plunger member after contact and previous to its rupture. To provide for an indication of this movement in my new machine I employ a sliding disk 61 arranged within the bore of the upper plunger actuating member and arranged to coöperate with the top of the lower plunger member, the disk being connected by a weak yielding friction ring 62 seated in its grooved periphery with the upper member, so that as the plunger spring is compressed and the upper member moves downward relatively to the lower member prior to a break of the material the drag due to the friction ring will maintain contact between the disk and the lower plunger member, although the latter may also be traveling downwardly a lesser distance because of the yielding of the material. This movement of the disk is communicated to a second, deflection-indicating dial B by means of an oval rod 64 having its lower end rotatably connected with the disk and detachably connected through a spring clip 65 with one end of a pivoted lever 66, the other end of such lever being equipped with a pin engaging a spiral groove formed upon a shaft 67 carrying the indicator hand 68, the arrangement and proportions of the parts being in the present instance such as to indicate upon the dial B the movement of the lower plunger member in one-thousandths of an inch. The oval rod 64 is slidingly mounted in a guide tube 69, the upper end of which is equipped with a button or knob 70, rotatably seated in the frame and the lower end of which carries a cup-shaped block 71 through which it makes sliding and also rotatable engagement with the bore of the upper plunger-actuating member. The knob 70 may be turned to an "off" position in which the oval rod passes freely through the approximately oval interior of the spring clip 65, and an "on" position at right angles thereto in which the longer diameter of the rod stands transversely of the narrowest part of the clip, thus frictionally connecting the latter to the rod. The free ends of the clip extend into a slot in the plunger-actuating member, by which it is prevented from rotating when the rod is turned to engage or disengage it, and it is sustained in place by its engagement with the end of the lever 66 of the indicating mechanism last above described. The clip and connected parts are made as light and nearly frictionless as possible and a light spring 72 is provided for elevating the forward end of the lever 66, to counteract the weight of the clip and restore the indicator hand to zero when the clip is disconnected from the rod.

In making tests both of the breaking strength and the stretch before breaking of a strip of material, the hand wheel is operated until the plunger member comes into contact with the rocking clamping plate 85. At this point the disk 61 (which has been left at the conclusion of a previous test in a more or less elevated position in the bore of the plunger-actuating member) is forced down into contact with the top of the plunger member by means of a suitable operating rod, (not shown), and the operating knob 70 turned to "on" position to connect the oval rod 64 with the indicating mechanism of dial B, such mechanism having been disconnected by turning the knob to "off" position at the end of the previous test, thus permitting the indicating mechanism of this dial to automatically return to zero position. Upon further operating the hand wheel the plunger spring will be compressed and its stress registered upon the pressure dial A. As the stress increases the material will yield more or less, the stretch being registered upon dial B. When the breaking point is reached the neck 89 of the strip will break, and the clamping plate 85 give way, the contact screw 41ª of the lower plunger member leaving the rack-bar 47, and the top of the plunger member leaving the disk 61, the indications on the dial A and B remaining unaffected and indicating respectively the spring stress necessary to break the strip and the stretch of the material previous to the break. The ratio of the plunger operating gearing is such as to produce a relatively slow movement of the plunger point, and the hand wheel is stopped immediately when the break occurs to prevent further registration upon dial B.

It is obvious that by the use of my invention, as embodied in the machine above described, I am able to test the characteristics of a sheet of paper, through tests of strips cut lengthwise of the grain, and across the grain, and the strength of the warp and woof of woven fabrics, and that I can make valuable tests as to the strength of any thin sheet material. It is further obvious that similar tests may be made of cord, string, wire, or strands or filaments of whatever sort, suitable modification of the clamping members being made if necessary to adapt them to grasp the particular material to be tested. It is further obvious that if desired the clamp upon the rocking clamping plate may be located at the inner end of such plate instead of in the particular location shown, at the outer end thereof.

I claim:

1. In combination with a machine of the character described and having a supporting frame including a bed plate and a plunger member and stress-indicating mechanism for indicating stress upon the plunger member mounted in said frame, means for measuring the tensile strength of a strip of material comprising a rocking plate arranged to coöperate with said plunger member and arranged to be secured to one end of the material, and securing means carried by the frame and arranged to hold the other end of the material.

2. In combination with a machine of the character described and having a supporting frame including a bed plate and a plunger member and stress-indicating mechanism for indicating stress upon the plunger member mounted in said frame, means of measuring the tensile strength of a strip of material comprising a rocking plate equipped at its outer end with a clamp arranged to hold one end of the material and at its inner end arranged to engage said plunger member, and clamping means mounted upon the frame and arranged to hold the other end of the material.

3. In combination with a machine of the character described and having a bed plate and a central supporting frame and a vertical plunger member and stress-indicating mechanism mounted in said frame, means for measuring the tensile strength of a strip of material comprising a rocking plate pivoted upon said bed plate adjacent its periphery and extending underneath said plunger member, said plate being equipped with a clamp arranged outside its pivotal support, and a clamp mounted on said frame and arranged vertically above the inner end of said rocking plate.

4. A structure for testing materials according to claim 3 in which the pivotal support of the rocking plate consists of a pair of legs and the bed plate is formed with holes loosely engaged by the legs.

5. A structure for testing materials according to claim 3 in which the inner end of the rocking plate is rounded and the outer end is equipped with a clamping member on its under side.

6. In combination with a machine of the character described and having a supporting frame and a spring-pressed plunger member and stress-indicating mechanism for measuring compression of the spring and also having deflection-indicating mechanism for measuring movement of the plunger member relative to the frame during compressive movement of the spring, means for measuring the breaking strength and stretch of a strip of material comprising a rocking plate arranged to be secured to one end of such strip and arranged to coöperate with said plunger member, and means for anchoring the other end of said strip to the frame.

JOHN W. WEBB.